US012606716B2

(12) United States Patent
Shankar et al.

(10) Patent No.: US 12,606,716 B2

(45) Date of Patent: Apr. 21, 2026

(54) BIOCIDE COMPOSITION

(71) Applicant: HEWLETT-PACKARD DEVELOPMENT COMPANY, L.P., Spring, TX (US)

(72) Inventors: Ravi Shankar, Wilsonville, OR (US); John L. Stoffel, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 745 days.

(21) Appl. No.: 17/975,342

(22) Filed: Oct. 27, 2022

(65) Prior Publication Data

US 2024/0158657 A1 May 16, 2024

(51) Int. Cl.

| | |
|---|---|
| ***C09D 11/38*** | (2014.01) |
| ***A01N 37/34*** | (2006.01) |
| ***A01N 43/40*** | (2006.01) |
| ***A01N 43/80*** | (2006.01) |
| ***A01N 47/12*** | (2006.01) |
| ***A01P 1/00*** | (2006.01) |
| ***C09D 11/40*** | (2014.01) |
| ***C09D 11/54*** | (2014.01) |

(52) U.S. Cl.

CPC .............. *C09D 11/38* (2013.01); *A01N 37/34* (2013.01); *A01N 43/40* (2013.01); *A01N 43/80* (2013.01); *A01N 47/12* (2013.01); *A01P 1/00* (2021.08); *C09D 11/40* (2013.01); *C09D 11/54* (2013.01)

(58) Field of Classification Search

CPC ......... C09D 11/38; C09D 11/54; C09D 11/40; A01N 37/34; A01N 43/40; A01N 47/12; A01N 43/80; A01P 1/00

See application file for complete search history.

(56) References Cited

U.S. PATENT DOCUMENTS

| | | | | |
|---|---|---|---|---|
| 6,533,408 B1 * | 3/2003 | Erdtmann | ................ | B41M 5/52 347/100 |
| 10,633,547 B2 | 4/2020 | Hahn et al. | | |
| 2008/0102094 A1 | 5/2008 | Bryant | | |
| 2010/0093736 A1 | 4/2010 | Coburn et al. | | |
| 2010/0264359 A1 | 10/2010 | Straetmans et al. | | |
| 2011/0046140 A1 | 2/2011 | Brutto et al. | | |
| 2012/0171272 A1 | 7/2012 | Premachandran et al. | | |
| 2013/0064899 A1 | 3/2013 | Schmidt et al. | | |
| 2017/0265466 A1 * | 9/2017 | Wachtler | ................ | C09D 5/025 |

FOREIGN PATENT DOCUMENTS

| | | | | | |
|---|---|---|---|---|---|
| BR | PI0716342 | A2 | | 3/2014 | |
| CN | 102026542 | A | | 4/2011 | |
| CN | 113881264 | A | * | 1/2022 | ............... C09D 5/14 |
| EP | 2247182 | A1 | | 11/2010 | |
| EP | 2732976 | A2 | * | 5/2014 | .......... B41J 11/0024 |
| EP | 2207416 | B1 | | 11/2018 | |
| JP | 5841621 | B2 | | 1/2016 | |
| WO | 2009/091450 | A1 | | 7/2009 | |
| WO | WO-2011159371 | A1 | * | 12/2011 | ............... C09D 7/61 |

OTHER PUBLICATIONS

Machine English translation of CN 113881264, Mo, Jan. 4, 2022.*

* cited by examiner

*Primary Examiner* — Patrick D Niland

(74) *Attorney, Agent, or Firm* — Dierker & Kavanaugh, P.C.

(57) ABSTRACT

Examples of a biocide composition include an activated halogen compound selected from the group consisting of 2,2-dibromo-3-nitrlopropionamide; 2-bromo-2-nitropropane-1,3-diol; and 1,2-dibromo-2,4-dicyanobutane; benzisothiazolin-3-one; a pyridine-N-oxide selected from the group consisting of zinc pyrithione and sodium pyrithione; and a carbamate derivative selected from the group consisting of 3-iodo-2-propynyl butyl carbamate; zinc bis(dimethyldithiocarbamate); and bis(dimethyl carbamoyl) disulfide.

17 Claims, 2 Drawing Sheets

100 ⌐            ⌐ 102

INKJET PRINTING AN INKJET FLUID COMPOSITION ON A RECORDING MEDIUM, THE
INKJET FLUID COMPOSITION INCLUDING:
A BIOCIDE COMBINATION INCLUDING:
AN ACTIVATED HALOGEN COMPOUND SELECTED FROM THE GROUP CONSISTING
OF 2,2-DIBROMO-3-NITRILOPROPIONAMIDE; 2-BROMO-2-NITROPROPANE-1,3-DIOL;
AND 1,2-DIBROMO-2,4-DICYANOBUTANE;
BENZISOTHIAZOLIN-3-ONE;
A PYRIDINE-N-OXIDE SELECTED FROM THE GROUP CONSISTING OF ZINC
PYRITHIONE AND SODIUM PYRITHIONE; AND
A CARBAMATE DERIVATIVE SELECTED FROM THE GROUP CONSISTING OF 3-
IODO-2-PROPYNYL BUTYL CARBAMATE; ZINC BIS(DIMETHYLDITHIOCARBAMATE); AND
BIS(DIMETHYL CARBAMOYL) DISULFIDE; AND
AN AQUEOUS VEHICLE INCLUDING WATER, A CO-SOLVENT, AND A SURFACTANT

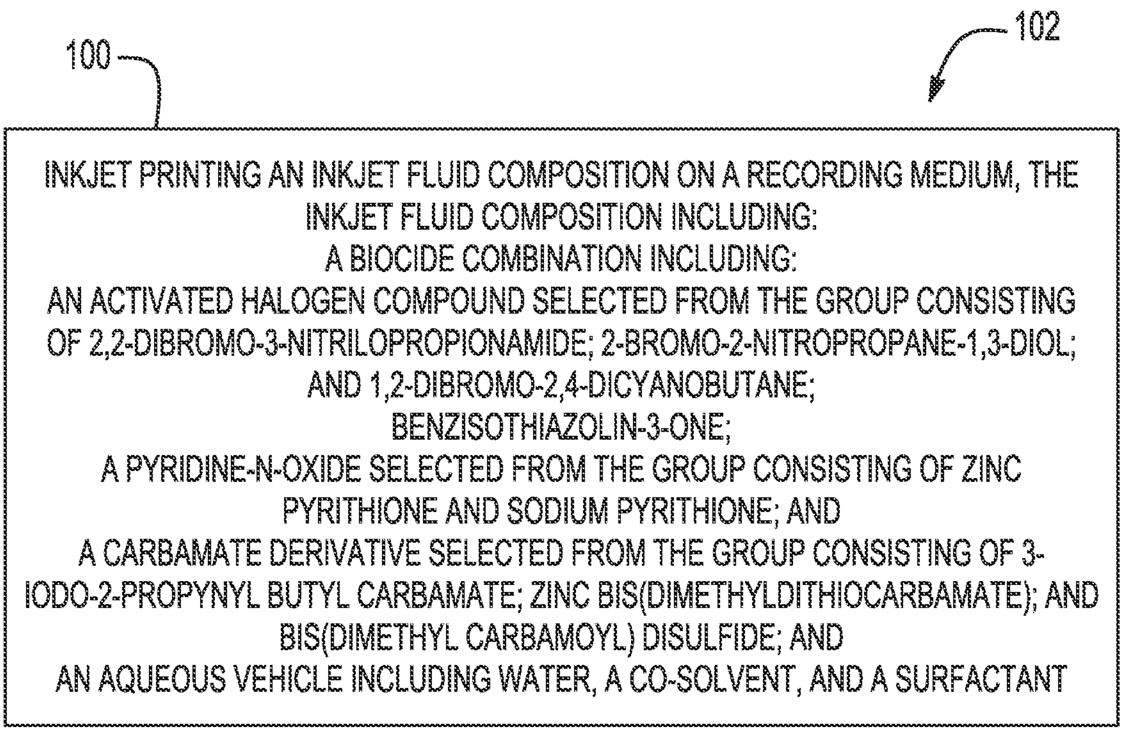

FIG. 1

BIOCIDE COMPOSITION

BACKGROUND

Biocides are widely used in a variety of industries, ranging from the food industry (e.g., as disinfectants and food preservatives) to the healthcare industry (e.g., to sterilize medical devices and disinfect surfaces) to the print industry (e.g., to improve ink shelf life). Biocides help to control microbial growth/contamination.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a flow diagram illustrating an example of a method of inkjet printing an inkjet fluid composition onto a recording medium.

DETAILED DESCRIPTION

Figures 2, 3, 4:
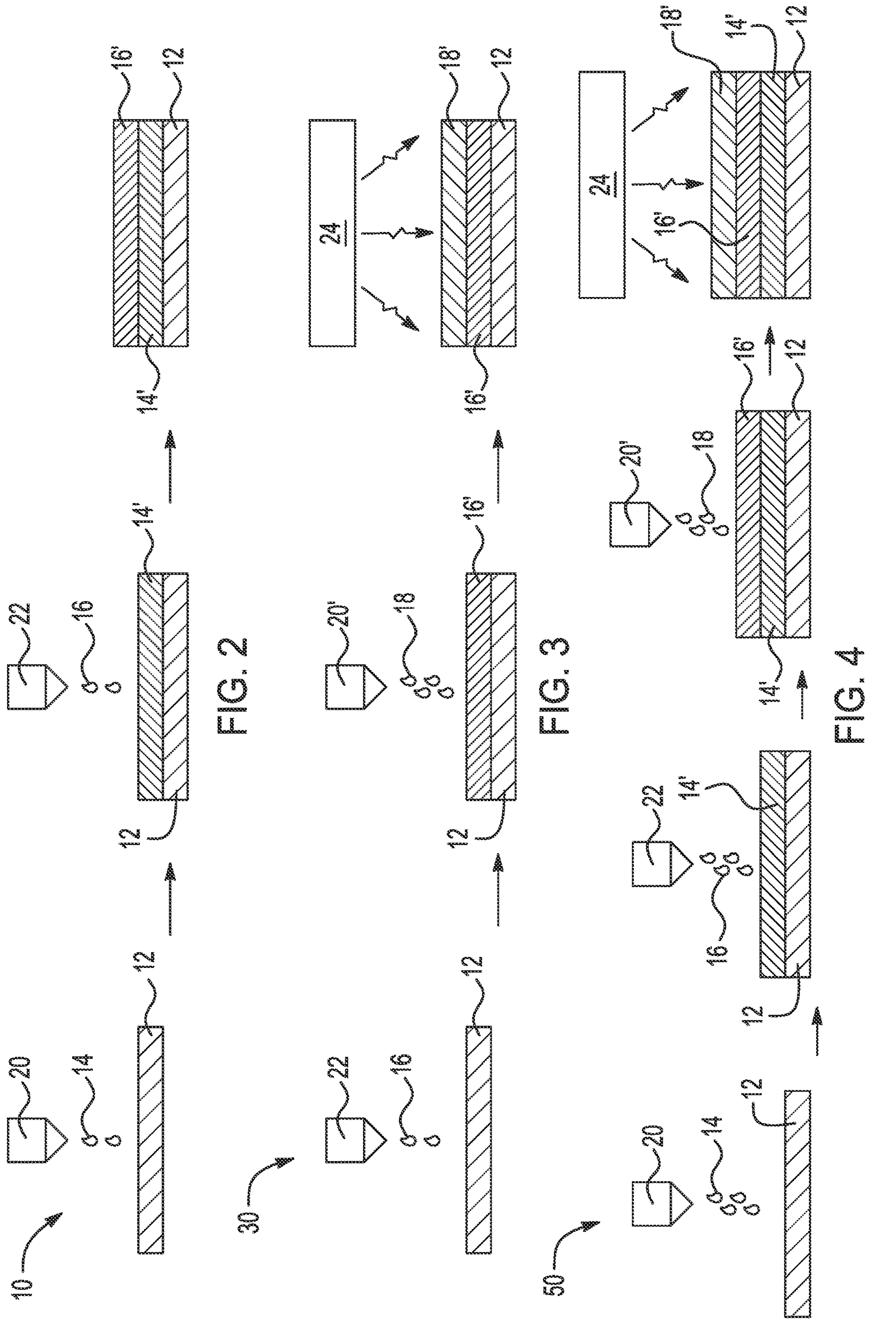
FIG. 2 is a schematic diagram of an example of a method of inkjet printing an inkjet fluid composition on a recording medium.
FIG. 3 is a schematic diagram of another example of a method of inkjet printing an inkjet fluid composition on a recording medium.
FIG. 4 is a schematic diagram of yet another example of a method of inkjet printing an inkjet fluid composition on a recording medium.

In inkjet printing, the composition of an inkjet fluid can affect both the printability and the shelf life of the inkjet fluid. The term "shelf life" refers to the relative length of time during which an inkjet fluid resists microbial contamination and/or remains suitable for use in inkjet printing. The term "printability" refers to an inkjet fluid's ability to be jetted, e.g., by thermal ejection or piezoelectric pressure, through a nozzle.

Over time and particularly during storage, microorganisms, such as a bacteria and/or fungi, may develop within inkjet fluids. Propagation of microorganisms within inkjet fluids can cause fluid degradation, clogging of print nozzles, and reduced shelf life of the inkjet fluid. To mitigate (and in some cases, prevent) the effects of microorganism propagation within inkjet fluids, biocides may be included in the fluids. As such, an inkjet fluid's performance, in terms of both printability and shelf life, may be controlled by modifying the biocide components of the fluid.

Described herein are examples of a biocide composition and examples of an inkjet fluid composition that is/are particularly suitable for controlling microbial growth. The biocide composition is a stock solution that contains all of the biocides disclosed herein and can be added to another fluid to assist in achieving antimicrobial properties. As examples, the biocide composition may be suitable for use in applications where it is desirable to suppress microbial growth, such as disinfectants, adhesives, coating compositions, etc. As another example, the biocide composition described herein may be included in, or incorporated into, the inkjet fluid composition. Throughout this disclosure, the term "biocide combination" is also used. It is to be understood that the biocide combination refers to the biocide components in an inkjet fluid composition, whether they are added as part of the biocide composition or as individual biocides.

Examples of the biocide composition described herein include an activated halogen compound selected from the group consisting of 2,2-dibromo-3-nitrilopropionamide; 2-bromo-2-nitropropane-1,3-diol; and 1,2-dibromo-2,4-dicyanobutane; benzisothiazolin-3-one; a pyridine-N-oxide selected from the group consisting of zinc pyrithione and sodium pyrithione; and a carbamate derivative selected from the group consisting of 3-iodo-2-propynyl butyl carbamate; zinc bis(dimethyldithiocarbamate); and bis(dimethyl carbamoyl) disulfide.

The present inventors have surprisingly found that the biocide composition, either alone or when incorporated into an inkjet fluid composition as a biocide combination, displays expansive antimicrobial properties. Inkjet fluid compositions that include the biocide combination have good printability and extended shelf life. Additionally, without being bound by any particular theory, it is believed that the presence of the biocide combination in an inkjet fluid composition may reduce the rate of thermal degradation of the fluid composition and/or the effects of thermal degradation on the fluid composition. As such, the biocide combination disclosed herein may improve the inkjet fluid composition's resistance to thermal degradation.

Throughout this disclosure, a weight percentage that is referred to as "wt % active" refers to the loading of an active component of a formulation that is present in the inkjet fluid composition. For example, a compound may be present in a water-based formulation (e.g., a dispersion) before being incorporated into the inkjet fluid composition. In this example, the wt % active of the compound accounts for the loading (as a weight percent) of the compound that is present in the inkjet fluid composition, and does not account for the weight of the other components (e.g., water, etc.) that are present in the formulation with the compound. The term "wt %," without the term active, refers to the loading of a 100% active component that does not include other non-active components therein.

The term "molecular weight," as used herein, refers to weight average molecular weight (Mw), the units of which are g/mol or Daltons.

Biocide Composition

Examples of the biocide composition disclosed herein include an activated halogen compound selected from the group consisting of 2,2-dibromo-3-nitrilopropionamide; 2-bromo-2-nitropropane-1,3-diol; and 1,2-dibromo-2,4-dicyanobutane; benzisothiazolin-3-one; a pyridine-N-oxide selected from the group consisting of zinc pyrithione and sodium pyrithione; and a carbamate derivative selected from the group consisting of 3-iodo-2-propynyl butyl carbamate; zinc bis(dimethyldithiocarbamate); and bis(dimethyl carbamoyl) disulfide. In one example, the biocide composition consists of the activated halogen compound; the benzisothiazolin-3-one; the pyridine-N-oxide; and the carbamate derivative.

The biocide composition includes the activated halogen compound. While not being bound by any particular theory, it is believed that each of the examples of the activated halogen compound disclosed herein may be an electrophilic-active substance which damages microbial membrane structures and interacts with nucleophilic entities in microbial cells, such as proteins and enzymes, to disrupt microbial growth. The term "electrophilic-active substance," as used herein, refers to an antimicrobial compound that accepts or donates electrons to form a bond.

In one specific example, the activated halogen compound is 2,2-dibromo-3-nitrilopropionamide.

In some examples, the activated halogen compound is present in the biocide composition in an amount ranging from about 5000 ppm to about 10000 ppm, based on a total weight of the biocide composition. In one specific example, the activated halogen is present in the biocide composition in an amount of about 8475 ppm.

The biocide composition further includes benzisothiazolin-3-one. While not being bound by any particular theory, it is believed that benzisothiazolin-3-one may also be an electrophilic-active substance which causes enzymatic inhibition and protein destruction in microbial entities to disrupt microbial growth.

In some examples, the benzisothiazolin-3-one is present in the biocide composition in an amount ranging from about 15000 ppm to about 25000 ppm, based on the total weight of the biocide composition. In one specific example, the benzothiazolin-3-one is present in the biocide composition in an amount of about 20339 ppm.

The biocide composition further includes the pyridine-N-oxide selected from the group consisting of zinc pyrithione and sodium pyrithione. In an example, the pyridine-N-oxide is sodium pyrithione. While not being bound by any particular theory, it is believed that the pyridine-N-oxide may be a membrane-active substance with chelating properties that influences microbial adenosine triphosphate (ATP) levels, protein synthesis processes, and nutrient transport functions to disrupt fungal growth. The term "membrane-active substance," as used herein, refers to an antimicrobial compound that can pass through and/or act upon a microbial cell membrane (e.g., of a prokaryotic or a eukaryotic cell) to disrupt the membrane and lead to the death of the microbial cell.

In some examples, the pyridine-N-oxide is present in the biocide composition in an amount ranging from about 50000 ppm to about 90000 ppm, based on the total weight of the biocide composition. In one specific example, the pyridine-N-oxide is present in the biocide composition in an amount of about 71186 ppm.

The biocide composition still further includes a carbamate derivative selected from the group consisting of 3-iodo-2-propynyl butyl carbamate; zinc bis(dimethyldithiocarbamate); and bis(dimethyl carbamoyl) disulfide. In an example, the carbamate derivative is 3-iodo-2-propynyl butyl carbamate. While not being bound by any particular theory, it is believed that the carbamate derivative may disturb cell membrane permeability and may affect fatty acid metabolism in fungal cells.

In some examples, the carbamate derivative is present in biocide composition in an amount ranging from about 125000 ppm to about 150000 ppm, based on the total weight of the biocide composition. In one specific example, the carbamate derivative is present in the biocide composition in an amount of about 135593 ppm.

As such, in some examples of the biocide composition disclosed herein, the activated halogen compound is present in an amount ranging from about 5000 ppm to about 10000 ppm, based on a total weight of the biocide composition; the benzisothiazolin-3-one is present in an amount ranging from about 15000 ppm to about 25000 ppm, based on the total weight of the biocide composition; the pyridine-N-oxide is present in an amount ranging from about 50000 ppm to about 90000 ppm, based on the total weight of the biocide composition; and the carbamate derivative is present in an amount ranging from about 125000 ppm to about 150000 ppm, based on the total weight of the biocide composition.

In one example of the biocide composition, the activated halogen compound is 2,2-dibromo-3-nitrilopropionamide, the pyridine-N-oxide is sodium pyrithione, and the carbamate derivative is 3-iodo-2-propynyl butyl carbamate.

The biocide composition may be prepared by combining suitable amounts of each of the activated halogen compound, the benzisothiazolin-3-one, the pyridine-N-oxide, and the carbamate derivative in a reaction vessel (e.g., a beaker, flask, etc.) to form the biocide stock solution (biocide composition).

It is to be understood that the biocide composition may include an inert solvent, i.e., one that does not deleteriously affect the properties of the individual biocides. Examples of inert solvents include glycols. The biocide composition may be free of water.

Inkjet Fluid Composition

As stated previously, the biocide composition may be included in an inkjet fluid composition as a biocide combination. Examples of suitable inkjet fluid compositions include inkjet inks, inkjet pre-treatment fluids, inkjet post-treatment fluids, and shipping and handling fluids. Any example of the inkjet fluid composition disclosed herein comprises the biocide combination including: an activated halogen compound selected from the group consisting of 2,2-dibromo-3-nitrilopropionamide; 2-bromo-2-nitropropane-1,3-diol; and 1,2-dibromo-2,4-dicyanobutane; benzisothiazolin-3-one; a pyridine-N-oxide selected from the group consisting of zinc pyrithione and sodium pyrithione; and a carbamate derivative selected from the group consisting of 3-iodo-2-propynyl butyl carbamate; zinc bis(dimethyldithiocarbamate); and bis(dimethyl carbamoyl) disulfide; and an aqueous vehicle including water, a co-solvent, and a surfactant.

In one example of the inkjet fluid composition, the biocide combination consists of the activated halogen compound; the benzisothiazolin-3-one; the pyridine-N-oxide; and the carbamate derivative.

In any example of the inkjet fluid composition, the activated halogen compound is present in an amount ranging from about 50 ppm to about 300 ppm, based on a total weight of the inkjet fluid composition; the benzisothiazolin-3-one is present in an amount ranging from about 100 ppm to about 360 ppm, based on the total weight of the inkjet fluid composition; the pyridine-N-oxide is present in an amount ranging from about 500 ppm to about 2500 ppm, based on the total weight of the inkjet fluid composition; and the carbamate derivative is present in an amount ranging from about 500 ppm to about 2500 ppm, based on the total weight of the inkjet fluid composition.

In another example, the activated halogen compound is present in the inkjet fluid composition in an amount ranging from about 75 ppm to about 200 ppm, based on a total weight of the inkjet fluid composition. In one specific example, the activated halogen compound is present in an amount of about 100 ppm, based on the total weight of the inkjet fluid composition.

In another example, benzisothiazolin-3-one is present in the inkjet fluid composition in an amount ranging from about 200 ppm to about 340 ppm, or from about 250 ppm to about 300 ppm, based on the total weight of the inkjet fluid composition. In an example, the benzisothiazolin-3-one is present in the inkjet fluid composition in an amount of about 280 ppm, based on the total weight of the inkjet fluid composition. In another example, the benzisothiazolin-3- one is present in the inkjet fluid composition in an amount of about 284 ppm, based on the total weight of the inkjet fluid composition.

In another example, the pyridine-N-oxide is present in the inkjet fluid composition in an amount ranging from about 750 ppm to about 2000 ppm, or from about 800 ppm to about 1500 ppm, based on the total weight of the inkjet fluid composition. In an example, the pyridine-N-oxide is present in the inkjet fluid composition in an amount of about 840 ppm, based on the total weight of the inkjet fluid composition.

In another example, the carbamate derivative is present in the inkjet fluid composition in an amount ranging from about 750 ppm to about 2000 ppm, or from about 900 ppm to about 1750 ppm, based on the total weight of the inkjet fluid composition. In an example, the carbamate derivative is present in the inkjet fluid composition in an amount of about 1600 ppm, based on the total weight of the inkjet fluid composition. In another example, the carbamate derivative is present in the inkjet fluid composition in an amount of about 1000 ppm, based on the total weight of the inkjet fluid composition.

As used herein, the term "aqueous vehicle" refers to the liquid with which the biocide combination and at least one other component (e.g., a colorant, a binder, a cationic fixing agent, etc.) are mixed to form the desired inkjet fluid composition.

In an example of the inkjet fluid composition, the activated halogen, the benzisothiazolin-3-one, the pyridine-N-oxide, and the carbamate derivative are soluble in the aqueous vehicle.

The aqueous vehicle (of the inkjet fluid composition) includes the co-solvent. The co-solvent may be a water-soluble or water-miscible organic co-solvent. Examples of co-solvents include alcohols, amides, esters, ketones, lactones, and ethers. In additional detail, the co-solvent may include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers (e.g., DOWANOL™ TPM (from Dow Chemical)), higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol. Other alcohols, such as polyhydric alcohols or derivatives thereof, may also be used. Examples of polyhydric alcohols may include ethylene glycol, diethylene glycol, propylene glycol, 2,2-dimethyl-1,3-propanediol, 2-amino-2-methyl-1,3-propanediol, 2-ethyl-2-(hydroxymethyl)-1,3-propanediol, butylene glycol, triethylene glycol, 1,5-pentanediol, 1,2-hexanediol, 1,2-butanediol, 1,2,6-hexanetriol, glycerin (i.e., glycerol), glycerol propoxylate, trimethylolpropane, and xylitol. Examples of polyhydric alcohol derivatives may include an ethylene oxide adduct of diglycerin. Some examples of the co-solvent also function as a humectant.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, triethanolamine, di-(2-hydroxyethyl)-5,5-dimethylhydantoin (commercially available as DANTOCOL™ DHE from Lonza).

The co-solvent(s) may be present in any example of the inkjet fluid composition in an amount ranging from about 0.1 wt % active to about 60 wt % active. Some specific ranges for the various types of inkjet fluid compositions are described further hereinbelow.

The aqueous vehicle in any example of the inkjet fluid composition further includes the surfactant. When the inkjet fluid composition is any of an inkjet ink, an inkjet pre-treatment fluid, an inkjet post-treatment fluid, or a shipping and handling fluid, the surfactant may be a non-ionic surfactant. In addition to or as an alternate to the non-ionic surfactant, an anionic surfactant may be used in the inkjet ink, the inkjet post-treatment fluid, or the shipping and handling fluid. In addition to or as an alternate to the non-ionic surfactant, a cationic surfactant may be used in the inkjet pre-treatment fluid.

Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

More specific examples of non-ionic surfactant include a silicone-free alkoxylated alcohol surfactant such as, for example, TEGO® Wet 510 (Evonik Degussa) and/or a self-emulsifiable wetting agent based on acetylenic diol chemistry, such as, for example, SURFYNOL® SE-F (Evonik Degussa). Other suitable commercially available non-ionic surfactants include MEGAFACE™ F444 (perfluoroalkyl ethylene oxide adduct available from DIC Corp.); DYNOL™ 604 (acetylenic diol based superwetter), SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Evonik Degussa); ZONYL® FSO (a.k.a. CAPSTONE®, which is a water-soluble, ethoxylated non-ionic fluorosurfactant from DuPont); TERGITOL® TMN-3 and TERGITOL® TMN-6 (both of which are branched secondary alcohol ethoxylate, non-ionic surfactants), and TERGITOL®15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Company); and BYK® 345, BYK® 346, BYK® 347, BYK® 348, BYK® 349 (each of which is a silicone surfactant) (all of which are available from BYK Additives and Instruments).

Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, sodium lauryl sulfate, and dibutylphenylphenol disulfonate.

Examples of the cationic surfactant include quaternary ammonium salts, such as benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, alkylbenzyldimethylammonium chlorides, distearyldimethylammonium chloride, diethyl ester dimethyl ammonium chloride, dipalmitoylethyl hydroxyethylmonium methosulfate, and ACCOSOFT® 808 (methyl (1) tallow amidoethyl (2) tallow imidazolinium methyl sulfate available from Stepan Company). Other examples of the cationic surfactant include amine oxides, such as lauryldimethylamine oxide, myristamine oxide, cocamine oxide, stearamine oxide, and cetamine oxide.

In any of the examples disclosed herein, the surfactant may be present in the inkjet fluid composition in an amount ranging from about 0.01 wt % active to about 5 wt % active, based on the total weight of the inkjet fluid composition. Some specific ranges for the various types of inkjet fluid compositions are described further hereinbelow.

The balance of the aqueous vehicle in any of the inkjet fluid compositions disclosed herein is water. As such, the weight percentage of the water present in the inkjet fluid composition will depend, in part, upon the weight percentages of the other components. The water may deionized water. In some examples, the aqueous vehicle is present in an amount of at least 30 wt %, based on the total weight of the inkjet fluid composition. In other examples, the aqueous vehicle is present in an amount of greater than 30 wt %, based on a total weight of the inkjet fluid composition, such as greater than 40 wt %, greater than 50 wt %, or greater than 60 wt %, based on the total weight of the inkjet fluid composition. In an example, the water may be present in an amount of up to 95 wt % based on the total weight of the inkjet fluid composition.

Inkjet Ink

In some examples, the inkjet fluid composition (described above) is an inkjet ink, and the inkjet fluid composition further comprises a colorant selected from the group consisting of a pigment and a dye.

As used herein, the term "colorant" generally includes organic or inorganic pigment particles or dyes.

In some examples of the inkjet ink, the colorant may be a pigment. In these examples, the pigment solids may be incorporated into the aqueous vehicle, or the pigment may be in the form of a dispersion that is added to the aqueous vehicle. When the pigment is incorporated as part of a pigment dispersion, it is to be understood that the pigment and separate pigment dispersant (prior to being incorporated into the aqueous vehicle) may be dispersed in water alone or in combination with an additional water-soluble or water-miscible organic co-solvent, such as 2-pyrrolidone, 1-(2-hydroxyethyl)-2-pyrrolidone, glycerol, 2-methyl-1,3-propanediol, 2,2-dimethyl-1,3-propanediol, 1,2-butane diol, diethylene glycol, 1,3-propanediol, 1,4-butanediol, 1,5-pentanediol, triethylene glycol, tetraethylene glycol, hexylene glycol, or a combination thereof. In these examples (e.g., when then pigment is incorporated as a pigment dispersion), the liquid components of the pigment dispersion become part of the aqueous vehicle of the inkjet ink.

In some examples, the pigment may be a cyan, magenta, black or yellow pigment.

Examples of suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow 5GT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL®400R, REGAL® 330R, REGAL®660R, MOGUL® L, BLACK PEARLS® L, MONARCH® 1400, MONARCH® 1300, MONARCH® 1100, MONARCH®1000, MONARCH®900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN®2000, RAVEN®1500, RAVEN®1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan color pigment may include C.I. Pigment Blue-1, -2, -3, -15, -15:1, -15:2, -15:3, -15:4, -16, -22, and -60.

Specific examples of a magenta color pigment may include C.I. Pigment Red-5, -7, -12, -48, -48:1, -57, -112, -122, -123, -146, -168, -177, -184, -202, and C.I. Pigment Violet-19.

Specific examples of black pigment include carbon black pigments. An example of an organic black pigment includes aniline black, such as C.I. Pigment Black 1.

Specific examples of a yellow pigment may include C.I. Pigment Yellow-1, -2, -3, -12, -13, -14, -16, -17, -73, -74, -75, -83, -93, -95, -97, -98, -114, -128, -129, -138, -151, -154, and -180.

In other examples where the inkjet fluid composition is an inkjet ink, the colorant may be a dye. In these examples, the dye solids may be incorporated into the aqueous vehicle (e.g., dissolved in the aqueous vehicle), or the dye may be in the form of a dispersion that is added to the aqueous vehicle. A dye may be dispersed in water alone or in combination with an additional water soluble or water miscible organic co-solvent, such as those described for the pigment dispersion. It is to be understood however, that the liquid components of the dye dispersion become part of the aqueous vehicle in the inkjet ink.

The dye can be nonionic, cationic, anionic, or a mixture of nonionic, cationic, and/or anionic dyes. The dye can be a hydrophilic anionic dye, a direct dye, a reactive dye, a polymer dye or an oil soluble dye. Specific examples of dyes that may be used include Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include ORASOL® Blue GN, ORASOL® Pink, and ORASOL® Yellow dyes available from BASF Corp. Black dyes may include Direct Black 154, Direct Black 168, Fast Black 2, Direct Black 171, Direct Black 19, Acid Black 1, Acid Black 191, Mobay Black SP, and Acid Black 2.

While several examples have been given herein, it is to be understood that any other pigment or dye can be used that is useful in imparting color to the inkjet ink.

As noted, the pigment or the dye may initially be present in a water-based dispersion. The pigment dispersion or the dye dispersion may then be incorporated into the aqueous vehicle so that the pigment or dye is present in an active amount that is suitable for the inkjet printing architecture that is to be used. In an example, the pigment or dye dispersion is incorporated into the aqueous vehicle so that the pigment or dye is present in an amount ranging from about 0.1 wt % active to about 15 wt % active, based on a total weight of the inkjet ink. In other examples, the pigment or dye dispersion is incorporated into the ink vehicle so that the pigment is present in an amount ranging from about 1 wt % active to about 10 wt % active, or from about 2 wt % active to about 5 wt % active, based on a total weight of the inkjet ink. In one example, the pigment or dye dispersion is incorporated into the ink vehicle so that the pigment or dye is present in an amount of about 3 wt % active, based on the total weight of the inkjet ink. In another example, the pigment or dye dispersion is incorporated into the ink vehicle so that the pigment or dye is present in an amount of about 3.250 wt % active, based on the total weight of the inkjet ink. In still another example, the pigment or dye dispersion is incorporated into the ink vehicle so that the pigment or dye is present in an amount of about 3.80 wt % active, based on the total weight of the inkjet ink.

Some examples of the inkjet ink disclosed herein also include a binder. The pigment based inkjet inks include an example of the binder. Some of the dye based inkjet inks include an example of the binder, while other examples of the dye based inkjet inks do not include the binder.

When the inkjet ink includes a binder, the binder can be selected from the group consisting of a polyurethane binder and a latex binder.

In some examples, the binder is a polyurethane resin. The polyurethane binder/resin may be present in the inkjet ink an amount ranging from about 0.01 wt % active to about 20 wt % active, based on the total weight of the inkjet ink. In another example, the amount of polyurethane binder present in the inkjet ink ranges from about 1 wt % active to about 10 wt % active or from about 5 wt % active to about 15 wt % active, based on the total weight of the inkjet ink. In one example, the amount of polyurethane binder present in the ink is about 1.1 wt % active, based on the total weight of the inkjet ink. In another example, the amount of polyurethane binder present in the ink is about 5.650 wt % active, based on the total weight of the inkjet ink.

In some examples, the polyurethane binder may be incorporated into the aqueous vehicle as a polyurethane binder dispersion. In these examples, it is to be understood that the liquid components of the polyurethane binder dispersion become a part of the aqueous vehicle.

The polyurethane binder, when used in a polyurethane binder dispersion, may be formed by synthesizing a polyurethane solution (i.e., a polyurethane polymer in an organic solvent), and then ionizing and dispersing the polyurethane solution in water to form polyurethane binder dispersion. The resulting polyurethane binder dispersion includes the polyurethane polymer, which is water soluble/dispersible. Each of these steps will be discussed further below.

The polyurethane binder is formed at least from the following components: (a) a polyisocyanate and (b) a polyol. Other components, such as hydroxylated (meth) acrylates, ionic compounds, etc. may be utilized in the synthesis of the polyurethane to introduce a desirable functionality (e.g., to improve water dispersability). In an example, the resulting polyurethane binder has a weight average molecular weight ($M_w$) equal to or less than 5,000, a glass transition temperature ($T_g$) less than 25° C., a double bond density higher than 4.0, and/or an acid number ranging from 5 to 30.

In addition, the polyurethane binder disclosed herein may have a ratio of isocyanate groups (NCO) to hydroxyl groups (OH) (i.e., NCO:OH ratio) that is greater than 1.8. In another example, the NCO:OH ratio of the polyurethane binder is equal to or greater than 2.1. In yet another example, the NCO:OH ratio ranges from about 2.6 to about 2.8.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphatic polyisocyanate. Some examples of suitable polyisocyanates include isophorone diisocyanate (IPDI), dicyclohexylmethane diisocyanate (H12MDI), hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, and combinations thereof. In an example, the polyisocyanate is chosen from IPDI, H12MDI, HDI and TMDI. In another example, the polyisocyanate is an aromatic diisocyanate, such as toluene diisocyanate (TDI) and methylenediphenyl diisocyanate (MDI).

Component (b) is a polyol. The term "polyol", as used herein, means any product having an average of about 2 or more hydroxyl groups per molecule. Some examples of suitable polyols for component (b) may be part of a first class of polyols. As examples, the first class of polyols has a number average molecular weight ranging from greater than 500 to about 5,000. In any of these examples, component (b) is a macro-glycol. Examples of suitable polyols of the first class include polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or mixtures thereof. In an example, the polyol is poly(propyleneglycol), poly(tetrahydrofuran), poly(ethyleneoxide), a polycarbonate polyol, or a polyester polyol.

Other examples of suitable polyols for component (b) may be part of a second class of polyols. The second class has a number average molecular weight that is 500 or lower. Examples of suitable polyols of the second class include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentylglycol, cyclohexane-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethyleneglycol, triethyleneglycol, tetraethyleneglycol, dipropyleneglycol, tripropyleneglycol, N-substituted ethanolamines, and mixtures thereof. In an example, the polyol is selected from 1,4-butanediol, 1,5-pentanediol, 3-methylpentane-1,5-diol, 1,6-hexanediol, neopentylglycol, and cyclohexane-1,4-dimethanol, trimethylolpropane, glycerol, or pentaerythritol.

It is to be understood that a combination of any of the listed polyols may be used.

The particle size of the polyurethane binder in the dispersion ranges from about 20 nm to about 200 nm. In an example, the particle size of the polyurethane binder ranges from about 20 nm to about 100 nm. The double bond density the polyurethane binder is greater than 4.0 meq/g. In an example, the double bond density ranges from greater than 4.0 meq/g to about 6.0 meq/g. The glass transition temperature ($T_g$) of the polyurethane binder is less than 25° C. This provides the inkjet ink with a tacky consistency (prior to curing) when applied to a recording medium.

Other examples of the inkjet ink include a latex binder. The latex binder includes latex particles. As used herein, the term "latex" refers to a stable dispersion of polymer particles in an aqueous medium. As such, the latex particles may be dispersed in water or water and a suitable co-solvent. It is to be understood that the co-solvents that are suitable for use in the polyurethane binder dispersions are also suitable for use in dispersions of polymer (latex) particles. This aqueous latex dispersion may be incorporated into the aqueous vehicle to form examples of the inkjet ink.

Prior to being incorporated into the inkjet ink, the latex binder may be dispersed in water alone or in combination with an additional water-soluble or water-miscible organic co-solvent, such as those described for the aqueous vehicle of the inkjet fluid composition. It is to be understood however, that in these examples, the liquid components of the binder dispersion become part of the aqueous vehicle in the inkjet ink. The latex binder may be anionic or non-ionic depending upon the monomers used.

The latex polymer particles are heteropolymers or copolymers. The heteropolymers may include a more hydrophobic component and a more hydrophilic component. In these examples, the hydrophilic component renders the particles dispersible in the inkjet ink, while the hydrophobic component is capable of coalescing upon reaching the minimum film formation temperature (MFFT) and thus forming a durable ink layer.

Examples of monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of hydrophilic monomers include acrylamide, methacrylamide, monohydroxylated monomers, monoethoxylated monomers, polyhydroxylated monomers, or polyethoxylated monomers.

In some examples of the heteropolymers disclosed herein, the more hydrophobic component(s) make up from about 65% to about 100% of the polymer, and the more hydrophilic component(s) make up from about 0.1% to about 35% of the polymer.

Some specific examples of the latex polymer particles are formed with the following monomer combinations: i) butyl acrylate, styrene, methyl methacrylate, and methacrylic acid; or ii) butyl acrylate, methyl methacrylate, methacrylic acid, cyclohexyl methacrylate, cyclohexyl acrylate, and 2-phenoxyethyl methacrylate.

In other examples, the latex particles can include a polymerization product of monomers including: a copolymerizable surfactant; an aromatic monomer selected from styrene, an aromatic (meth)acrylate monomer, and an aromatic (meth)acrylamide monomer, and multiple aliphatic (meth)acrylate monomers or multiple aliphatic (meth)acrylamide monomers. The term "(meth)" indicates that the acrylamide, the acrylate, etc., may or may not include the methyl group. In one example, the latex particles can include a polymerization product of a copolymerizable surfactant such as HITENOL™ BC-10, BC-30, KH-05, or KH-10.

In another particular example, the latex particles can include a first heteropolymer phase and a second heteropolymer phase. The first heteropolymer phase is a polymerization product of multiple aliphatic (meth)acrylate monomers or multiple aliphatic (meth)acrylamide monomers. The second heteropolymer phase can be a polymerization product of an aromatic monomer with a cycloaliphatic monomer, wherein the aromatic monomer is an aromatic (meth)acrylate monomer or an aromatic (meth)acrylamide monomer, and wherein the cycloaliphatic monomer is a cycloaliphatic (meth)acrylate monomer or a cycloaliphatic (meth)acrylamide monomer. The second heteropolymer phase can have a higher glass transition temperature than the first heteropolymer phase. The first heteropolymer composition may be considered a soft polymer composition and the second heteropolymers composition may be considered a hard polymer composition.

The two phases can be physically separated in the latex particles, such as in a core-shell configuration, a two-hemisphere configuration, smaller spheres of one phase distributed in a larger sphere of the other phase, interlocking strands of the two phases, and so on.

The first heteropolymer composition can be present in the latex particles in an amount ranging from about 15 wt % to about 70 wt % of a total weight of the polymer (latex) particle and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle and the second heteropolymer composition can be present in an amount ranging from about 60 wt % to about 70 wt % of the total weight of the polymer particle. In one specific example, the first heteropolymer composition can be present in an amount of about 35 wt % of a total weight of the polymer particle and the second heteropolymers composition can be present in an amount of about 65 wt % of the total weight of the polymer particle.

As mentioned herein, the first heteropolymer phase can be polymerized from two or more aliphatic (meth)acrylate ester monomers or two or more aliphatic (meth)acrylamide monomers. The aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers can include ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Also as mentioned herein, the second heteropolymer phase can be polymerized from a cycloaliphatic monomer and an aromatic monomer. The cycloaliphatic monomer can be a cycloaliphatic (meth)acrylate monomer or a cycloaliphatic (meth)acrylamide monomer. The aromatic monomer can be an aromatic (meth)acrylate monomer or an aromatic (meth)acrylamide monomer. The cycloaliphatic monomer of the second heteropolymer phase can be cyclohexyl acrylate, cyclohexyl methacrylate, methylcyclohexyl acrylate, methylcyclohexyl methacrylate, trimethylcyclohexyl acrylate, trimethylcyclohexyl methacrylate, ter-butylcyclohexyl acrylate, tert-butylcyclohexyl methacrylate, or a combination thereof. In still further examples, the aromatic monomer of the second heteropolymer phase can be 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, or a combination thereof.

The latex particles can have a particle size ranging from 20 nm to 500 nm, from 50 nm to 350 nm, or from 150 nm to 270 nm.

In some examples, the latex particles can be prepared by flowing multiple monomer streams into a reactor. An initiator can also be included in the reactor. The initiator may be selected from a persulfate, such as a metal persulfate or an ammonium persulfate. In some examples, the initiator may be selected from a sodium persulfate, ammonium persulfate or potassium persulfate. The preparation process may be performed in water, resulting in the aqueous latex dispersion.

Some examples of the latex binders are acrylic latex binders. Some examples of anionic acrylic latex binders include JANTEX™ Binder 924 and JANTEX™ Binder 45 NRF (both of which are available from Jantex). Other examples of anionic acrylic latex binders include TEXICRYL™13-216, TEXICRYL™ 3-217, TEXICRYL™ 13-220, TEXICRYL-™ 13-294, TEXICRYL-™13-295, TEXICRYL-™ 13-503, and TEXICRYL™ 13-813 (each of which is available from Scott Bader). Still other examples of anionic acrylic latex binders include TUBIFAST™ AS 4010 FF, TUBIFAST™ AS 4510 FF, and TUBIFAST™ AS 5087

FF (each of which is available from CHT). Examples of non-ionic acrylic latex binders include PRINTRITE™ 595, PRINTRITE™ 2015, PRINTRITE™ 2514, PRINTRITE™ 9691, and PRINTRITE™ 96155 (each of which is available from Lubrizol Corporation). Another example of a non-ionic acrylic latex binder includes TEXICRYL™ 13-440 (available from Scott Bader).

In some examples of the inkjet ink, the latex binder is present in an amount ranging from about 2 wt % active to about 20 wt % active, based on a total weight of the inkjet ink. In other examples, the latex binder is present in the inkjet ink in an amount ranging from about 5 wt % active to about 15 wt % active, based on the total weight of the inkjet ink.

In some examples, the inkjet fluid composition is the inkjet ink, and the inkjet fluid composition consists of the biocide combination; the aqueous vehicle including the water, the co-solvent, and the surfactant; the colorant; and the binder.

In other examples, the inkjet fluid composition is an example of the inkjet ink disclosed herein, and the inkjet ink fluid composition further includes an additive selected from the group consisting of an anti-decel agent; an anti-kogation agent; a pH adjuster; a chelating agent; and combinations thereof. In one of these examples, the inkjet fluid composition consists of the biocide combination; the aqueous vehicle including the water, the co-solvent, and the surfactant; the colorant; the binder; and the additive.

The inkjet ink may include anti-decel agent(s). The anti-decel agent may function as a humectant. Decel refers to a decrease in drop velocity over time with continuous firing. In the examples disclosed herein, the anti-decel agent(s) is/are included to assist in preventing decel. In some examples, the anti-decel agent may improve the jettability of the inkjet ink. An example of a suitable anti-decel agent is ethoxylated glycerin having the following formula:

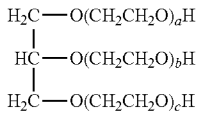

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Vantage Specialty Chemicals).

The anti-decel agent(s) may be present in an amount ranging from about 0.2 wt % active to about 5 wt % active (based on the total weight of the inkjet ink). In an example, the anti-decel agent is present in the inkjet ink in an amount of about 1 wt % active.

Anti-kogation agent(s) may be included in the inkjet ink to assist in preventing the buildup of kogation. Kogation refers to the deposit of dried printing liquid on a heating element of a thermal inkjet printhead. In some examples, the anti-kogation agent may improve the jettability of the inkjet ink. The anti-kogation agent(s) may be present in the inkjet ink in a total amount ranging from about 0.1 wt % active to about 1.5 wt % active, based on the total weight of the inkjet ink. In an example, the anti-kogation agent(s) is/are present in an amount of about 0.5 wt % active, based on the total weight of the inkjet ink.

Examples of suitable anti-kogation agents include oleth-3-phosphate (commercially available as CRODAFOS™ O3A or CRODAFOS™ N-3A), oleth-5-phosphate (commercially available as CRODAFOS™ O5A), or dextran 500 k. Other suitable examples of the anti-kogation agents include CRODAFOS™ HCE (phosphate-ester from Croda Int.), CRODAFOS™ CES (phosphate-based emulsifying and conditioning wax from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The inkjet ink may include pH adjuster(s). The type and amount of pH adjuster that is added may depend upon the initial pH of the inkjet ink and the desired final pH of the inkjet ink. If the initial pH is too high (e.g., above 12), an acid may be added to lower the pH, and if the initial pH is too low (below 7.5), a base may be added to increase the pH. Examples of suitable acidic pH adjusters that may be used include methane sulfonic acid, nitric acid and phosphoric acid. Examples of suitable basic pH adjusters include metal hydroxide bases, such as potassium hydroxide (KOH), sodium hydroxide (NaOH), etc. In an example, the metal hydroxide base may be added to the inkjet ink in an aqueous solution. In another example, the metal hydroxide base may be added to the inkjet ink in an aqueous solution including 5 wt % of the metal hydroxide base (e.g., a 5 wt % potassium hydroxide aqueous solution).

In an example, the total amount of pH adjuster(s) in the inkjet ink ranges from greater than 0 wt % active to about 0.1 wt % active (based on the total weight of the inkjet ink).

The inkjet ink may include chelating agent(s). A chelating agent may be used to bond with or otherwise interact with another atom or molecule (e.g., metal ions or molecules), and may prevent that atom or molecule from interacting or reacting with other chemically active species in a solution. When included, the chelating agent is present in an amount greater than 0 wt % active and less than or equal to 0.5 wt % active based on the total weight of the inkjet ink. In an example, the chelating agent is present in an amount ranging from about 0.05 wt % active to about 0.2 wt % active based on the total weight of the inkjet ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The balance of the inkjet ink is water (e.g., deionized water).

In one example of a method for generating the inkjet ink, the activated halogen is added to an amount of water suitable to dissolve the activated halogen and form a solution. The benzisothiazolin-3-one is then added to the solution, followed by the desired co-solvent(s) and surfactant(s). The carbamate derivative is then added to the solution, followed by the pyridine-N-oxide. When added directly, each of the biocide components of the biocide combination present within the respective ppm ranges set forth herein for the inkjet fluid composition. This may be achieved by adding each of the biocide components in an amount ranging from about 0.05 wt % active to about 2 wt % active, based on the total weight of the inkjet ink. The solution containing the biocide combination is then mixed with the colorant, and the binder (if used). A balance of water may then be added, e.g., to achieve the desired final loading of the various components. In another example, the biocide composition is added with the colorant and the binder (if used) to the aqueous vehicle. In this example, the biocide composition is present in the inkjet ink in an amount ranging from about 1 wt % to about 3 wt %. Any suitable mixing or stirring process may be performed following the addition of any new component to the solution/dispersion to aid in dissolving and/or dispersing the component(s).

Shipping and Handling Fluid

In some examples, the inkjet fluid composition is a shipping and handling fluid. Shipping and handling fluids may be used in printheads and printbar assemblies of inkjet printers. These fluids may be introduced into the printer fluidic system and may be maintained therein during shipping and/or storage. The fluids may be used, in part, to keep air bubbles from forming in the fluidic system prior to the first use of the inkjet printer. These fluids are purged from the fluidic system prior to printing with ink.

In some examples, the inkjet fluid composition is the shipping and handling fluid, and the inkjet fluid composition consists of the biocide combination and the aqueous vehicle (e.g., water and any of the co-solvent(s) and surfactant(s) set forth herein). As one example, the shipping and handling fluid includes one or more co-solvents present in a total amount ranging from about 35 wt % active to about 45 wt % active, one or more surfactant(s) present in a total amount ranging from about 1 wt % active to about 2 wt % active, each of the biocide components of the biocide combination present within the respective ppm ranges set forth herein for the inkjet fluid composition, and a balance of water (where each of the amounts is based on a total weight of the shipping and handling fluid). In this example, the biocide components of the biocide combination are added to the shipping and handling fluid individually (e.g., not from the stock solution). When added directly, each of the biocide components may be added in an amount ranging from about 0.05 wt % active to about 2 wt % active, based on the total weight of the shipping and handling fluid. As another example, the biocide composition (i.e., the stock solution) is added to the shipping and handling fluid, and the biocide composition is present in the shipping and handling fluid in an amount ranging from about 1 wt % active to about 3 wt % active. In this other example, it is to be understood that the amount of the biocide composition that is added results in each of the biocide components being present within the respective ppm ranges set forth herein for the inkjet fluid composition.

In other examples, the inkjet fluid composition is the shipping and handling fluid, and the inkjet fluid composition includes the biocide combination, the aqueous vehicle, and an additive. It is to be understood that any of the additives described herein in reference to the inkjet ink may also be used in the shipping and handling fluid.

Colorless Treatment Fluid

In some examples, the inkjet fluid composition is a colorless treatment fluid. By "colorless," it is meant that the fluid is devoid of a colorant. Colorless treatment fluids may be pre-treatment fluids that are applied to a recording medium prior to the application of a pigmented inkjet ink. The pre-treatment fluid may aid in fixing pigments in the inkjet ink at the surface of the recording medium. Colorless treatment fluids may alternatively be post-treatment fluids that are applied to a recording medium subsequent to the application of an inkjet ink. The post-treatment fluid may be used to form a film over the inkjet ink in order to improve durability and/or gloss.

In one example, the inkjet fluid composition is a colorless pre-treatment fluid that further comprises a cationic fixing agent (in addition to the biocide combination). In this example, the colorless pre-treatment fluid includes the cationic fixing agent and the biocide combination, with or without additional water. In other examples, the colorless pre-treatment fluid includes the cationic fixing agent, the biocide combination, and an aqueous vehicle, which includes any of the surfactants and co-solvents set forth herein as well as water. In other examples, the colorless pre-treatment fluid includes the cationic fixing agent, the biocide combination, the aqueous vehicle, and a cationic binder.

In some examples, the cationic fixing agent is a polyvalent metal salt. The polyvalent metal salt component can be a divalent or a higher polyvalent metallic ion and anion. In some examples, the polyvalent metal salt component is soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In some other examples, the polyvalent metallic ion is selected from the group consisting of $Ca^{2+}$, $Mg^{2+}$ or $Zn^{2+}$. In yet some other examples, the polyvalent metallic ions are $Ca^{2+}$. Examples of anions include $Cl^-$, $I^-$, $Br^-$, $NO_3^-$ or $RCOO^-$ (where R is H or any hydrocarbon chain). The polyvalent metal salt anion can be a chloride ($Cl^-$) or acetate ($CH_3COO^-$). In some examples, the polyvalent metal salt is composed of divalent or polyvalent metallic ions and of nitrate or carboxylate ions. The carboxylate ions are derived from a saturated aliphatic monocarboxylic acid having 1 carbon atom to 6 carbon atoms or a carbocyclic monocarboxylic acid having 7 carbon atoms to 11 carbon atoms. Examples of saturated aliphatic monocarboxylic acid having 1 carbon atom to 6 carbon atoms include formic acid, acetic acid, propionic acid, butyric acid, isobutyric acid, valeric acid, isovaleric acid, pivalic acid, and hexanoic acid. In some examples, the cationic fixing agent is a polyvalent metal salt selected from the group consisting of calcium chloride, calcium nitrate, magnesium nitrate, magnesium acetate or zinc acetate. In some other examples, the polyvalent metal salt is calcium chloride or calcium nitrate ($CaCl_2$ or $Ca(NO_3)_2$). In yet other examples, the polyvalent metal salt is calcium chloride ($CaCl_2$).

In other examples, the cationic fixing agent is a cationic polymer. As used herein, the term "cationic polymer" refers to an ionic polymer where the specific ions are cationic in nature, e.g. a quaternized polyamine. Polymeric cationic polymers, also referred to as cationic polyelectrolytes, may contain either guanidinium or fully quaternized ammonium functionalities, such as quaternized polyamine copolymers. In some examples, the cationic polymer does not contain primary or secondary ammonium functionalities, such as polyallylamine or polyethylene imine, due to yellowing issues in outdoor exposure. Classes of cationic polymers that can be used include, for example, quaternized polyamines, dicyandiamide polycations, diallyldimethyl ammonium chloride copolymers, quaternized dimethylaminoethyl (meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other anion. An example of a suitable cationic polymer is FLOQUAT® FL2350, a quaternized polyamine derived from epichlorohydrin and dimethyl amine, commercially available from SNF Inc.

The weight average molecular weight (Mw) of the cationic polymer may allow viscosity less than 25 cP at 25° C., as measured on a Brookfield viscometer. In some examples, the Mw are less than 500,000, for example less than 50,000.

In some examples, the pre-treatment fluid includes the cationic fixing agent (either the polyvalent metal salt or the cationic polymer) in an amount ranging from about 0.1 wt % to about 25 wt %, for example, from about 0.5 wt % to about 10 wt %, or for another example, from about 0.5 wt % to about 5 wt %, or for still another example, from about 1 wt % to about 2.5 wt % by total weight of the pre-treatment fluid.

In another example, the inkjet fluid composition is a colorless post-treatment fluid that further comprises (in addition to the biocide combination) a thermoplastic material having a melting temperature ranging from about 40° C. to about 250° C. and a binder. The thermoplastic material may be present in the post-treatment fluid in an amount ranging from about 8 wt % active to about 12 wt % active. In this example, the colorless post-treatment fluid includes the thermoplastic material, the binder, and the biocide combination, with or without additional water. In other examples, the colorless post-treatment fluid includes the thermoplastic material, the binder, the biocide combination, and an aqueous vehicle, which includes any of the surfactants and co-solvents set forth herein as well as water.

The thermoplastic material in the post-treatment fluid may be a single thermoplastic material or a combination of two or more thermoplastic materials. Whether used alone or in combination, the thermoplastic materials each have a melting temperature ranging from about 40° C. to about 250° C. A combination of two or more thermoplastic materials may include two or more thermoplastic materials having different molecular structures and/or two or more thermoplastic materials with the same molecular structure but different molecular weights (e.g., polyethylene wax and polyethylene solid beads). When a combination of wax and other materials are utilized, the weight ratio of wax:material may range from 100:1 to 100:50.

The thermoplastic material(s) may be in the form of a dispersion or an emulsion. The thermoplastic material(s) may be natural materials or polyolefin-based materials. Some thermoplastic material(s) are non-ionic, anionic, or cationic materials. As examples, the thermoplastic material(s) may be a beeswax, a camauba wax, a candelilla wax, a montan wax, a Fischer-Tropsch wax, a polyethylene-based wax, a high density polyethylene-based wax, a polybutene-based wax, a paraffin-based wax, a polytetrafluoroethylene-based material, a polyamide-based material, a polypropylene-based wax, and combinations of any of these waxes and materials.

The post-treatment fluid also includes a binder. Example binders for the post-treatment fluid include poly(vinyl alcohol) (PVA), polyethylene-co-polyvinyl alcohol, cationic poly(vinyl alcohol), poly(vinyl alcohol) with acetoacetyl functional groups, poly(vinyl alcohol) with silanol functional groups, anionic poly(vinyl alcohol)), polyvinylpyrrolidone polymers, polyvinylpyrrolidone copolymers, polyethylene oxide, polyethylene oxide copolymers, polypropylene oxide, polypropylene oxide copolymers, polyacrylic polymers, polyacrylic copolymers, poly(vinyl acetate), raw starches, chemically modified starches, phenolic-based resins, polyester-based resins, polyurethanes, amino-based resins, epoxy-based resins, polyaramides, polybenzimidazole, polyoxadiazole, polypyromellitimide, or combinations thereof.

The amount of binder present in the post-treatment fluid may be dependent upon the amount of the thermoplastic material that is included. For example, a weight ratio of the thermoplastic material to the binder ranges from about 100:1 to about 1:1. As such, in some examples, up to 100 times more (based on weight) of the thermoplastic material may be used than the binder. In other examples, the same weight percent of the thermoplastic material and binder may be used. As an example, the weight ratio of the thermoplastic material to the binder ranges from about 20:1 to about 10:1.

Recording Medium

The inkjet ink disclosed herein may be particularly suitable for absorptive media, such as plain paper, enhanced paper, coated paper, or any other porous media. In an example, the recording medium is selected from the group consisting of coated paper and uncoated paper.

As used herein, "plain paper" refers to paper that has not been specially coated or designed for specialty uses (e.g., photo printing). Plain paper is composed of cellulose fibers and fillers. In contrast to an enhanced paper (described below), plain paper does not include an additive that produces a chemical interaction with a pigment in an ink that is printed thereon.

Also as used herein, "enhanced paper" refers to paper that has not been specially coated, but does include the additive that produces a chemical interaction with a pigment in an ink that is printed thereon. The enhanced paper is composed of cellulose fibers, fillers, and the additive. An example of the additive is calcium chloride or another salt that instantaneously reacts with an anionic pigment present in the ink printed on the enhanced paper, which causes the pigment to crash out of the ink and fixes the pigment on the enhanced paper surface. As an example, the enhanced paper may be any standard paper that incorporates COLORLOK® Technology (International Paper Co.). Both plain paper and enhanced paper are commercially available as general office printer and/or copier papers, but, as previously mentioned, the enhanced paper incorporates the COLORLOK® Technology. Examples of plain paper used herein include Georgia-Pacific Spectrum Multipurpose paper (from Georgia-Pacific), Hammermill Great White 30 (from Hammermill), Williamsburg 50# White Smooth Offset Plus (from International Paper), and an uncoated paper available from Pegasus. An example of enhanced paper used herein is HP® Multipurpose paper media with COLORLOK® technology (from HP Development Company).

In some examples, the recording medium may be coated paper. In these examples, the paper recording medium may have an ink receiving layer that interacts with the inkjet ink. Some commercially available examples are Sterling Ultra Gloss (SUG #80, an offset coated media from Verso Corporation), 80 #Opus Gloss and Somerset matte 70 #, both available from Sappi Lmtd.

The inkjet ink (and in particular the examples including the latex binder) disclosed herein may also be particularly suitable for non-porous polymeric substrates. The term "non-porous" does not infer that the substrate is devoid of any and all pores in every case, but rather indicates that the substrate does not permit bulk transport of a fluid through the substrate. In some examples, a non-porous substrate can permit very little water absorption, at or below 0.1 vol %. In yet another example, a non-porous substrate can allow for gas permeability. In another example, however, a non-porous substrate can be substantially devoid of pores.

In some examples, the non-porous polymeric substrate is treated, or exposed to a surface treatment that renders the substrate more susceptible to ink adhesion. Examples of treated non-porous polymeric substrates include treated biaxially oriented polypropylene or other polyolefin, treated low density polyethylene (density less than 0.93 $g/cm^3$), and treated high density polyethylene (density from 0.93 $g/cm^3$ to 0.97 $g/cm^3$).

In other examples, the non-porous polymeric substrate is untreated, which as noted herein, refers to both a lack of any chemical treatment, etching, coating, etc., as well as a lack of any specific mechanical treatment to modify the surface thereof, such as patterning, roughening, etc., in order to make the non-porous polymeric substrate more receptive to the inkjet inks. Furthermore, when referring to untreated substrates, this can also include non-porous polymeric substrates that can lack functional groups at a print surface that can aid in adhesion of ink to the substrate. In some examples, the untreated materials can be unmodified chemically and/or mechanically at the surface of the substrate as well as unmodified along the polymer chain of the material.

Examples of uncoated or untreated polymeric substrates may include a polyolefin, such as a polyethylene or a polypropylene. In another example, the non-porous polymeric substrate can be a biaxially oriented polyolefin, such as a biaxially oriented polypropylene or other polyolefin. In an example, the non-porous polymeric substrate is untreated biaxially oriented polypropylene. As used herein, a "biaxially-oriented" substrate refers to a substrate that has a stretched crystal or structural orientation in at least two directions or axes. This process can generate non-porous polymeric films that can have a higher tensile strength (per given thickness), greater stiffness, enhanced fluid barrier, etc.

Some other examples of untreated non-porous polymeric substrates include polyvinyl chloride, low density polyethylene (density less than 0.93 $g/cm^3$), high density polyethylene (density from 0.93 $g/cm^3$ to 0.97 $g/cm^3$), polyethylene terephthalate, polystyrene, polylactic acid, polytetrafluoroethylene (e.g., TEFLON® from the Chemours Company), or blends thereof, or blends of any of these with a polyolefin.

The inkjet ink disclosed herein is also suitable for printing on a variety of textile fabrics, including polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof.

Printing Methods

FIG. 1 depicts an example of a printing method 100. As shown in FIG. 1, an example of the printing method 100 comprises: inkjet printing an inkjet fluid composition on a recording medium, the inkjet fluid composition including: a biocide combination including: an activated halogen compound selected from the group consisting of 2,2-dibromo-3-nitrilopropionamide; 2-bromo-2-nitropropane-1,3-diol; and 1,2-dibromo-2,4-dicyanobutane; benzisothiazolin-3-one; a pyridine-N-oxide selected from the group consisting of zinc pyrithione and sodium pyrithione; and a carbamate derivative selected from the group consisting of 3-iodo-2-propynyl butyl carbamate; zinc bis(dimethyldithiocarbamate); and bis(dimethyl carbamoyl) disulfide; and an aqueous vehicle including water, a co-solvent, and a surfactant (reference numeral 102).

It is to be understood that any example of the inkjet ink, the pre-treatment fluid, and/or the post-treatment fluid may be used in the method 100, as well as the variations of the method 100 described in reference to FIG. 2 through FIG. 4. Further, it is to be understood that any example of the recording medium may be used in the method 100.

In one example of the printing method 100, the inkjet fluid composition is an inkjet ink; the inkjet fluid composition further includes: a colorant selected from the group consisting of a pigment and a dye; and a latex binder; and the printing method further comprises drying the recording medium having the inkjet fluid composition printed thereon.

In another example of the printing method 100, the inkjet fluid composition is a colorless pre-treatment fluid or a colorless post-treatment fluid; and the method further comprises inkjet printing an inkjet ink on the recording medium before the colorless post-treatment fluid is applied or after the colorless pre-treatment fluid is applied. Different examples of the printing method 100 are described in reference to FIG. 2 through FIG. 4.

FIG. 2 schematically depicts an example of a printing method 10. In examples of the printing method 10, a pre-treatment fluid 14 and an inkjet ink 16 are used. The pre-treatment fluid 14 shown in FIG. 2 includes the biocide combination, the aqueous vehicle, and the cationic fixing agent. The inkjet ink 16 shown in FIG. 2 includes the biocide combination, the aqueous vehicle, the colorant, and the binder.

In an example method, a recording medium 12 is placed into an inkjet printer (not shown) equipped with applicators 20, 22 for respectively digitally printing the pre-treatment fluid 14 and the inkjet ink 16. Any suitable inkjet applicator (i.e., inkjet printhead), such as a thermal inkjet printhead, a piezoelectric printhead, a continuous inkjet printhead, etc. may be used. In some examples, digital printing of the fluid 14 and the ink 16 is performed with a thermal inkjet printer equipped with thermal inkjet printheads. The pre-treatment fluid 14 and the inkjet ink 16 may be maintained in respective reservoirs/fluid supplies that fluidly connect to the respective printheads 20, 22. The respective reservoirs/fluid supplies may be contained in separate cartridges or separate compartments of a single inkjet cartridge.

In the method shown in FIG. 2, the pre-treatment fluid 14 is directly applied to a portion of the recording medium 12 from the applicator 20, forming a pre-treatment layer 14'. The inkjet ink 16 is then applied by the inkjet applicator 22 to the portion of the recording medium 12 having the pre-treatment layer 14' thereon, forming an inkjet layer 16'. In some instances, the inkjet ink 16 is applied on the pre-treatment layer 14' while the pre-treatment layer 14' is wet. Wet on wet printing may be desirable because the printing workflow may be simplified without additional drying. In an example of wet on wet printing, the inkjet ink 16 is printed onto the pre-treatment layer 14' within a period of time ranging from about 0.01 second to about 30 seconds after the pre-treatment fluid 14 is printed.

After printing, the recording medium 12 having the pre-treatment layer 14' and the inkjet layer 16' thereon may be exposed to drying. While not shown in the figures, ambient drying, air drying, and/or drying with a radiant heat source (e.g., an infrared (IR) lamp) are all suitable methods of drying the layers 14', 16'.

In an example of the method 10, each of the pre-treatment fluid 14 and the inkjet ink 16 is applied in an amount ranging from about 5 gsm to about 400 gsm. In another example, each of the pre-treatment fluid 14 and the inkjet ink 16 is applied in an amount ranging from about 100 gsm to about 300 gsm.

FIG. 3 schematically depicts another example of a printing method 30. In this example of the printing method 30, an inkjet ink 16 and a colorless post-treatment fluid 18 are used.

The inkjet ink 16 shown in FIG. 2 includes the biocide combination, the aqueous vehicle, the colorant, and the binder. The colorless post-treatment treatment fluid 18 shown in FIG. 3 includes the thermoplastic material, the binder, the biocide combination, and an aqueous vehicle.

In an example method, a recording medium 12 is placed into an inkjet printer (not shown) equipped with applicators 22, 20' for respectively digitally printing the inkjet ink 16 and the post-treatment fluid 18. Any suitable inkjet applicator (i.e., inkjet printhead), such as a thermal inkjet printhead, a piezoelectric printhead, a continuous inkjet printhead, etc. may be used. In some examples, digital printing of the ink 16 and the fluid 18 is performed with a thermal inkjet printer equipped with thermal inkjet printheads. The inkjet ink 16 and the post-treatment fluid 18 may be maintained in respective reservoirs/fluid supplies that fluidly connect to the respective printheads 22, 20'. The respective reservoirs/fluid supplies may be contained in separate cartridges or separate compartments of a single inkjet cartridge.

The inkjet ink 16 is directly applied to a portion of the recording medium 12 from the inkjet applicator 22, forming an inkjet layer 16'. The colorless post-treatment fluid 18 is then applied by the applicator 20' to the portion of the recording medium 12 having the inkjet layer 16' thereon. The ink 16 and fluid 18 may be applied using wet on wet printing. In some examples, the inkjet layer 16' is permitted to dry (e.g., using any of the drying techniques described hereinabove), and then the fluid 18 is applied to the portion of the recording medium 12 having the inkjet layer 16' thereon.

In an example of the method 10, each of the inkjet ink 16 and the post-treatment fluid 18 is applied in an amount ranging from about 5 gsm to about 400 gsm. In another example, each of the inkjet ink 16 and the post-treatment fluid 18 is applied in an amount ranging from about 100 gsm to about 300 gsm.

In this example method 30, a heating system 24 may be part of the inkjet printer or part of a separate off-line heating system. The heating system 24 includes mechanisms and/or devices that expose the printed-on medium 12 (having ink layer 16' and the post-treatment layer 18' applied thereon) to sufficient heat and pressure to form a protective layer/film on the medium 12. Heat and pressure from the heating system 24 enable the protective layer/film to firmly bind to the medium 12. The heat raises the temperature of the post-treatment layer 18' to the minimum film formation temperature of the thermoplastic material. This process enables the thermoplastic material in the post-treatment layer 16' to soften up, which renders them readily able to form the film under pressure. After heating, the components in the post-treatment layer 16' are fixed on the image surface and the medium surface.

FIG. 4 schematically depicts still another example of a printing method 50. In this example of the printing method 50, a pre-treatment fluid 14, inkjet ink 16, and a colorless treatment fluid 18 are used. The pre-treatment fluid 14 shown in FIG. 4 includes the biocide combination, the aqueous vehicle, and the cationic fixing agent. The inkjet ink 16 shown in FIG. 4 includes the biocide combination, the aqueous vehicle, the colorant, and the binder. The colorless post-treatment treatment fluid 18 shown in FIG. 4 includes the thermoplastic material, the binder, the biocide combination, and an aqueous vehicle.

In an example method, a recording medium 12 is placed into an inkjet printer (not shown) equipped with applicators 20, 22, 20' for respectively digitally printing the pre-treatment fluid 14, the inkjet ink 16, and the post-treatment fluid 18. Any suitable inkjet applicator (i.e., inkjet printhead), such as a thermal inkjet printhead, a piezoelectric printhead, a continuous inkjet printhead, etc. may be used. In some examples, digital printing of the ink 16 and the fluids 14, 18 is performed with a thermal inkjet printer equipped with thermal inkjet printheads. The pre-treatment fluid 14, the inkjet ink 16, and the post-treatment fluid 18 may be maintained in respective reservoirs/fluid supplies that fluidly connect to the respective printheads 20, 22, 20'. The respective reservoirs/fluid supplies may be contained in separate cartridges or separate compartments of a single inkjet cartridge.

The pre-treatment fluid 14 is directly applied to a portion of the recording medium 12 from the applicator 20, forming a pre-treatment layer 14'. The inkjet ink 16 is then applied by the inkjet applicator 22 to the portion of the recording medium 12 having the pre-treatment layer 14' thereon, forming an ink layer 16'. The colorless treatment fluid 18 is then applied by the applicator 20' to the portion of the recording medium 12 having the pre-treatment layer 14' and the inkjet layer 16' thereon, forming a colorless post-treatment layer 18'. In this example, wet on wet on wet printing may be used. The ink 16 and fluids 14, 18 may be applied at any of the coat weights set forth herein.

The printed layers 14', 16', 18' may then be exposed to heating and pressure as described in reference to FIG. 3.

While not shown in FIG. 2 through FIG. 4, in some examples of the methods 10, 30, 50, multiple inkjet inks 16 may be inkjet printed onto the recording medium 12. Each of the inkjet inks 16 may include a different colored pigment or dye as the colorant so that a different color (e.g., cyan, magenta, yellow, black, violet, green, brown, orange, purple, etc.) is generated by each of the inkjet inks 16. In other examples of the methods 10, 30, 50, a single inkjet ink 16 may be inkjet printed onto the recording medium 12.

Additionally, in any of the methods 10, 30, 50 shown in FIG. 2 through FIG. 4, the pre-treatment fluid 14 and/or the post-treatment fluid 18 may be applied using an analog applicator. When an analog method is used, the pre-treatment fluid 14 and/or the post-treatment fluid 18 may be applied using an auto analog pretreater, a drawdown coater, a slot die coater, a roller coater, a fountain curtain coater, a blade coater, a rod coater, an air knife coater, a sprayer, or a gravure application. In these examples, the pre-treatment fluid 14 and/or the post-treatment fluid 18 may be coated on all or substantially all of the recording medium 12 (and any layer(s) 14' and/or 16' thereon). As such, the pre-treatment layer 14' and/or the post-treatment layer 18' that is/are formed may be continuous layer(s) that cover all or substantially all of the recording medium 12.

The method used for the application of the pre-treatment fluid 14 and/or the post-treatment fluid 18 may depend upon the viscosity of the respective fluids 14, 18. For example, when the viscosity of the pre-treatment fluid 14 is higher than the viscosity ranges set forth herein for thermal or piezoelectric inkjet printing, an analog method may be used.

Furthermore, in any example of the method 10, 30, 50 used to print the inkjet ink containing the latex binder, it is to be understood that the printed ink layer 16' may be exposed to a heating process to soften the latex so that the printed ink layer 16' forms a film. This heating process is performed so that the ink layer 16' is heated to the minimum film formation temperature of the latex binder in the inkjet ink 16.

The inkjet printing of the inkjet ink 16 may be accomplished at high printing speeds. In an example, the inkjet printing of the inkjet ink, and the fluids 14 and/or 18 when used, may be accomplished at a printing speed of at least 25 feet per minute (fpm). In another example, the inkjet ink, and the fixer fluid when used, may be inkjet printed at a printing speed ranging from 100 fpm to 1000 fpm.

Another example method involves the shipping and handling fluid described herein. In this example, the method includes introducing a shipping and handling fluid into the fluidic system of an inkjet printer; maintaining the shipping and handling fluid in the fluidic system during shipping and/or storage; and purging the shipping and handling fluid from the fluidic system prior to printing with ink.

To further illustrate the present disclosure, two examples are given herein. It is to be understood that these example are provided for illustrative purposes and are not to be construed as limiting the scope of the present disclosure.

EXAMPLES

Example 1

To demonstrate the antimicrobial properties of the biocide composition described herein, six comparative ink formulations 1-6 were prepared, and an example ink formulation 7 was prepared. Each of the comparative ink formulations 1-6 and the example ink formulation 7 had all the same components except for the biocide components that were used to prepare each formulation. The comparative ink formulations 1-6 are shown in Table 1A and the example ink formulation 7 is shown in Table 1B:

TABLE 1A

| Ink Component | Ink Composition ID | | | | | |
|---|---|---|---|---|---|---|
| | Comp. Ink 1 | Comp. Ink 2 | Comp. Ink 3 | Comp. Ink 4 | Comp. Ink 5 | Comp. Ink 6 |
| | Wt. % | | | | | |
| MERGAL ® 530 (20% active 2,2-dibromo-3-nitrilopropropionamide (DBNPA)) | 0.05 | 0 | 0 | 0 | 0 | 0.05 |
| ACTICIDE ® B20 (20% active Benzisothiazolin-3-one (BIT)) | 0.12 + 0.022* | 0.12 + 0.022* | 0 + 0.022* | 0 + 0.022* | 0.12 + 0.022* | 0.12 + 0.022* |
| TROYSHIELD ® FSP40 (~40% active Na Pyrithione) | 0 | 0 | 0 | 0.475 | 0.21 | 0.21 |
| FUNGITROL ™ 720 (20% active 3-iodo-2-propynyl butyl carbamate (IPBC)) | 0 | 0.8 | 0.8 | 0 | 0 | 0 |
| DANTOCOL ™ DHE (~90% active) | 8.00 | 8.00 | 8.00 | 8.00 | 8.00 | 8.00 |
| 1-(2-hydroxyethyl)-2-pyrrolidone (100% active) | 1.00 | 1.00 | 1.00 | 1.00 | 1.00 | 1.00 |
| Triethanolamine (100% active) | 0.80 | 0.80 | 0.80 | 0.80 | 0.80 | 0.80 |
| Glycerol propoxylate (100% active) | 1.50 | 1.50 | 1.50 | 1.50 | 1.50 | 1.50 |
| polyurethane resin (100% active) | 1.10 | 1.10 | 1.10 | 1.10 | 1.10 | 1.10 |
| Sodium lauryl sulfate (100% active) | 0.24 | 0.24 | 0.24 | 0.24 | 0.24 | 0.24 |
| SURFYNOL ® 440 (100% active) | 0.35 | 0.35 | 0.35 | 0.35 | 0.35 | 0.35 |
| MEGAFACE ™ F444 (100% active) | 0.07 | 0.07 | 0.07 | 0.07 | 0.07 | 0.07 |
| Magenta Pigment Dispersion** | 3.00 | 3.00 | 3.00 | 3.00 | 3.00 | 3.00 |
| Deionized Water | Balance | Balance | Balance | Balance | Balance | Balance |

*additional BIT amount from pigment dispersion
**percentages represent wt % active pigment

TABLE 1B

| Ink Component | Ink Composition ID Ex. Ink 7 Wt. % |
|---|---|
| MERGAL ® 530 (20% active 2,2-dibromo-3-nitrilopropropionamide (DBNPA)) | 0.05 |
| ACTICIDE ® B20 (20% active Benzisothiazolin-3-one (BIT)) | 0.12 + 0.022* |
| TROYSHIELD ® FSP40 (~40% active Na Pyrithione) | 0.21 |
| FUNGITROL ™ 720 (20% active 3-iodo-2-propynyl butyl carbamate (IPBC)) | 0.8 |
| DANTOCOL ™ DHE (~90% active) | 8.00 |
| 1-(2-hydroxyethyl)-2-pyrrolidone (100% active) | 1.00 |
| Triethanolamine (100% active) | 0.80 |
| Glycerol propoxylate (100% active) | 1.50 |
| polyurethane resin (100% active) | 1.10 |
| Sodium lauryl sulfate (100% active) | 0.24 |
| SURFYNOL ® 440 (100% active) | 0.35 |
| MEGAFACE ™ F444 (100% active) | 0.07 |
| Magenta Pigment Dispersion** | 3.00 |
| Deionized Water | Balance |

*additional BIT amount from pigment dispersion
**percentages represent wt % active pigment After each of the comparative inks 1-6 and the example ink 7 were prepared, bacterial biofilms, specifically *M. chelonae, Methylobacteria*, and *P. aeruginosa*, were permitted to develop/mature in individual reaction vessels for 14 days. A pre-determined quantity of each of comparative inks 1-6 and example ink 7 was separately added to individual biofilm-containing reaction vessels, so that each vessel contained only one kind of ink. Biofilm survival was assessed after 1, 4, and 7 days of incubation. An ink film was considered to exhibit strong bio-robustness if no biofilms survived after 4 days (biofilm score=3); the film was considered to exhibit moderate bio-robustness if detectable biofilms remained after 4 days but not at 7 days (biofilm score=2); and the film was considered to exhibit light bio-robustness if detectable biofilms remained after 7 days (biofilm score=1). The biofilm scores are shown in Table 2:

TABLE 2

| Bacterial biofilm | Ink Composition ID | | | | | | |
|---|---|---|---|---|---|---|---|
| | Comp. Ink 1 | Comp. Ink 2 | Comp. Ink 3 | Comp. Ink 4 | Comp. Ink 5 | Comp. Ink 6 | Ex. Ink 7 |
| *M. chelonae* | 1 | 2 | 1 | 2 | 2 | 2 | 3 |
| *Methylobacteria* | 1 | 2 | 2 | 3 | 3 | 3 | 3 |
| *P. aeruginosa* | 3 | 3 | 3 | 3 | 3 | 3 | 3 |
| Total Biofilm Score | 5 | 7 | 6 | 8 | 8 | 8 | 9 |

As can be seen, the biofilm treated with example ink 7, which was prepared using an example of the inkjet fluid composition described herein, displayed a total biofilm score of 9. This score was higher than the total scores obtained for comparative inks 1-6. These results indicate that for example ink 7, a lower amount of biofilm remained in the vessel after the assessment period(s), relative to the biofilms that were treated with comparative inks 1-6.

Example 2

To demonstrate the solubility properties of the components of inkjet inks that had been prepared using the biocide components described herein, comparative ink formulation 8 and example ink formulation 9 were respectively prepared using different biocide components. Comparative ink formulation 8 and example ink formulation 9 had all the same components except for the biocides that were used to prepare each formulation. The components of each of comparative ink formulation 8 and example ink formulation 9 are shown in Table 3:

TABLE 3

| Ink Component | Ink Composition ID | |
|---|---|---|
| | Comparative Ink 8 | Example Ink 9 |
| | Wt. % | |
| MERGAL ® 530 (20% active 2,2-dibromo-3-nitrilopropropionamide (DBNPA)) | 0 | 0.05 |
| ACTICIDE ® B20 (20% active Benzisothiazolin-3-one (BIT)) | 0.12 + 0.022* | 0.12 + 0.022* |
| TROYSHIELD ® FSP40 (~40% active Na Pyrithione) | 0 | 0.21 |
| FUNGITROL ™ 720 (20% active 3-iodo-2-propynyl butyl carbamate (IPBC)) | 1.2 | 0.8 |
| DANTOCOL ™ DHE (~90% active) | 8.00 | 8.00 |
| 1-(2-hydroxyethyl)-2-pyrrolidone (100% active) | 1.00 | 1.00 |
| Triethanolamine (100% active) | 0.80 | 0.80 |
| Glycerol propoxylate (100% active) | 1.50 | 1.50 |
| polyurethane resin (100% active) | 1.10 | 1.10 |
| Sodium lauryl sulfate (100% active) | 0.24 | 0.24 |
| SURFYNOL ® 440 (100% active) | 0.35 | 0.35 |
| MEGAFACE ™ F444 (100% active) | 0.07 | 0.07 |
| Pigment Dispersion** | 3.00 | 3.00 |
| Deionized Water | Balance | Balance |

*additional BIT amount from pigment dispersion
**percentages represent wt % active pigment A qualitative visual solubility test was performed on comparative ink 8 and on example ink 9 to determine whether substantially all of the solids present in the ink(s) were dissolved. A result of "yes" indicated that no visually detectable undissolved solids remained in the solution, while a result of "no" indicated that visually detectable undissolved solids remained in the solution. The results of the solubility tests are shown in Table 4:

TABLE 4

| Ink Composition | Soluble (Yes/No) |
|---|---|
| Comparative Ink 8 | No |
| Example Ink 9 | Yes |

Fourier Transform Infrared Spectroscopy (FTIR) was performed on the residue of comparative ink 8, and these results (not reproduced herein) identified IPBC as the insoluble component.

As can be seen, the components of example ink 8 (prepared from example biocide composition 8) displayed good solubility, which indicates the ink's capability of being jetted, e.g., through a digital thermal printhead. In contrast, the components of comparative ink 9 (which was prepared using comparative biocide composition 9) displayed poor solubility, meaning that undissolved solids remained in the ink prepared using the comparative biocide composition. The undissolved solids could deleteriously affect the jettability of the comparative ink.

It is to be understood that the ranges provided herein include the stated range and any value or sub-range within the stated range, as if the value(s) or sub-range(s) within the stated range were explicitly recited. For example, a range from about 100 ppm to about 360 ppm, should be interpreted to include not only the explicitly recited limits of from about 100 ppm to about 360 ppm, but also to include individual values, such as about 105 ppm, about 200 ppm, 300 ppm, 320 ppm, 380 ppm, etc., and sub-ranges, such as from about 225 ppm to about 340 ppm, from about 200 ppm to about 350 ppm, from about 125 ppm to about 300 ppm, etc. Furthermore, when the term "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A biocide composition, consisting of:

an activated halogen compound selected from the group consisting of 2,2-dibromo-3-nitrilopropionamide and 2-bromo-2-nitropropane-1,3-diol;

benzisothiazolin-3-one;

a pyridine-N-oxide selected from the group consisting of zinc pyrithione and sodium pyrithione;

a carbamate derivative selected from the group consisting of 3-iodo-2-propynyl butyl carbamate; zinc bis(dimethyldithiocarbamate); and bis(dimethyl carbamoyl) disulfide; and optionally, an inert solvent.

2. The biocide composition as defined in claim 1 wherein:

the activated halogen compound is present in an amount ranging from about 5000 ppm to about 10000 ppm, based on a total weight of the biocide composition;

the benzisothiazolin-3-one is present in an amount ranging from about 15000 ppm to about 25000 ppm, based on the total weight of the biocide composition;

the pyridine-N-oxide is present in an amount ranging from about 50000 ppm to about 90000 ppm, based on the total weight of the biocide composition; and the carbamate derivative is present in an amount ranging from about 125000 ppm to about 150000 ppm, based on the total weight of the biocide composition.

3. The biocide composition as defined in claim 1 wherein the activated halogen compound is 2,2-dibromo-3-nitrilopropionamide, the pyridine-N-oxide is sodium pyrithione, and the carbamate derivative is 3-iodo-2-propynyl butyl carbamate.

4. An inkjet fluid composition, comprising:

a biocide combination, consisting of:

an activated halogen compound selected from the group consisting of 2,2-dibromo-3-nitrilopropionamide and 2-bromo-2-nitropropane-1,3-diol;

benzisothiazolin-3-one;

sodium pyrithione; and a carbamate derivative selected from the group consisting of 3-iodo-2-propynyl butyl carbamate; zinc bis(dimethyldithiocarbamate); and bis(dimethyl carbamoyl) disulfide; and an aqueous vehicle including water, a co-solvent, and a surfactant.

5. The inkjet fluid composition as defined in claim 4 wherein:

the activated halogen compound is present in an amount ranging from about 50 ppm to about 300 ppm, based on a total weight of the inkjet fluid composition;

the benzisothiazolin-3-one is present in an amount ranging from about 100 ppm to about 360 ppm, based on the total weight of the inkjet fluid composition;

the pyridine-N-oxide is present in an amount ranging from about 500 ppm to about 2500 ppm, based on the total weight of the inkjet fluid composition; and the carbamate derivative is present in an amount ranging from about 500 ppm to about 2500 ppm, based on the total weight of the inkjet fluid composition.

6. The inkjet fluid composition as defined in claim 4 wherein:

the inkjet fluid composition is an inkjet ink; and the inkjet fluid composition further comprises a colorant selected from the group consisting of a pigment and a dye.

7. The inkjet fluid composition as defined in claim 6, wherein the inkjet ink further comprises a binder selected from the group consisting of a polyurethane binder and a latex binder.

8. The inkjet fluid composition as defined in claim 6, further comprising an additive selected from an anti-decel agent; an anti-kogation agent; a pH adjuster; a chelating agent; and combinations thereof.

9. The inkjet fluid composition as defined in claim 4, wherein:

the inkjet fluid composition is a shipping and handling fluid; and the inkjet fluid composition consists of the biocide combination and the aqueous vehicle.

10. The inkjet fluid composition as defined in claim 4, wherein the inkjet fluid composition is a colorless post-treatment fluid that further comprises:

a thermoplastic material having a melting temperature ranging from about 40° C. to about 250° C.; and a binder.

11. The inkjet fluid composition as defined in claim 4, wherein:

the inkjet fluid composition is a colorless pre-treatment fluid that further comprises a cationic fixing agent.

12. The inkjet fluid composition as defined in claim 4 wherein the activated halogen compound, the benzisothiazolin-3-one, the pyridine-N-oxide, and the carbamate derivative are soluble in the aqueous vehicle.

13. A printing method, comprising:

inkjet printing an inkjet fluid composition on a recording medium, the inkjet fluid composition including:

a biocide combination, consisting of:

an activated halogen compound selected from the group consisting of 2,2-dibromo-3-nitrilopropionamide and 2-bromo-2-nitropropane-1,3-diol;

benzisothiazolin-3-one;
sodium pyrithione; and
a carbamate derivative selected from the group consisting of 3-iodo-2-propynyl butyl carbamate; zinc bis(dimethyldithiocarbamate); and bis(dimethyl carbamoyl) disulfide; and
an aqueous vehicle including water, a co-solvent, and a surfactant.

14. The printing method as defined in claim 13 wherein:
the inkjet fluid composition is an inkjet ink;
the inkjet fluid composition further includes:
a colorant selected from the group consisting of a pigment and a dye; and
a latex binder; and
the printing method further comprises drying the recording medium having the inkjet fluid composition printed thereon.

15. The printing method as defined in claim 13 wherein:
the inkjet fluid composition is a colorless pre-treatment fluid or a colorless post-treatment fluid; and
the method further comprises inkjet printing an inkjet ink on the recording medium before the colorless post-treatment fluid is applied or after the colorless pre-treatment fluid is applied.

16. The inkjet fluid composition as defined in claim 4 wherein the activated halogen compound is 2,2-dibromo-3-nitrilopropionamide, and the carbamate derivative is 3-iodo-2-propynyl butyl carbamate.

17. The printing method as defined in claim 13 wherein the activated halogen compound is 2,2-dibromo-3-nitrilopropionamide, and the carbamate derivative is 3-iodo-2-propynyl butyl carbamate.

* * * * *